April 1, 1941.    F. SCHEUER    2,237,165
COLOR MATCHING AID DEVICE
Filed April 17, 1940

INVENTOR
Frank Scheuer
BY
ATTORNEY

Patented Apr. 1, 1941

2,237,165

UNITED STATES PATENT OFFICE 2,237,165

COLOR MATCHING AID DEVICE

Frank Scheuer, Bronx, N. Y.

Application April 17, 1940, Serial No. 330,004

3 Claims. (Cl. 88—14)

This invention relates to new and useful improvements in a color matching aid device.

The invention proposes the construction of a device as mentioned which is characterized by a stiff base sheet and a plurality of superimposed concentric disc sheets axially rotatively mounted on the base sheet and of progressively smaller diameters from the bottom disc to the top disc and arranged with annular areas divided into sections displaying different colors.

Another object of the invention resides in the construction of a device in which an intermediate disc of said group of discs comprises an annular section of stiff material having a flexible rubber sheet mounted across its center in a manner so that the annular section may be moved laterally to place portions of it closer to a desired color section on an adjacent sheet.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
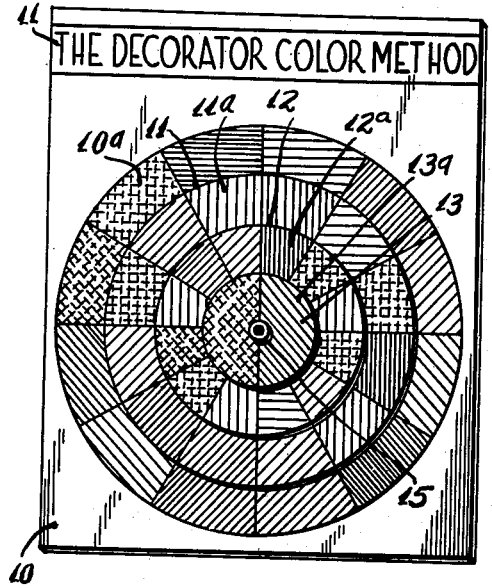
Fig. 1 is a perspective view of a color matching aid device constructed in accordance with this invention.

The color matching aid device, in accordance with this invention, includes a stiff base sheet 10. This sheet may be imprinted with a design 11 or with other printed matter. A plurality of superimposed concentric disc sheets 11, 12 and 13 are axially rotatively mounted on the base sheet 10 and are arranged so that the smaller discs are progressively at the top. The sheets 10—13 inclusive are imprinted with concentric annular areas 10ª, 11ª, 12ª and 13ª. Each of these areas is divided into a plurality of small sections, as illustrated in Fig. 1. Each of these segmental sections is painted or imprinted with a different color.

A pintle rivet 15 engages through the centers of the sheets for rotatively connecting them together. The imprinted annular area 10ª on the base sheet 10 is imprinted about the edge of the adjacent disc 11. The annular areas on the various discs are imprinted along their edges on projecting portions which may be viewed by looking at the device.

The disc 12 is constructed of an annular section 12ᵇ of stiff material mounted on the edge portion of a sheet of flexible elastic material 12ᶜ. This flexible elastic material 12ᶜ is in the nature of a thin rubber sheet. At its center the flexible rubber sheet 12ᶜ is provided with an eyelet 12ᵈ through which the pintle rivet 15 passes. A washer 16 is mounted on the pintle rivet 15 immediately above the rubber sheet 12ᶜ so as to hold the top disc 13 properly spaced from the rubber sheet 12ᶜ to permit the annular section 12ᵇ to slide beneath the top disc 13.

Figure 2:
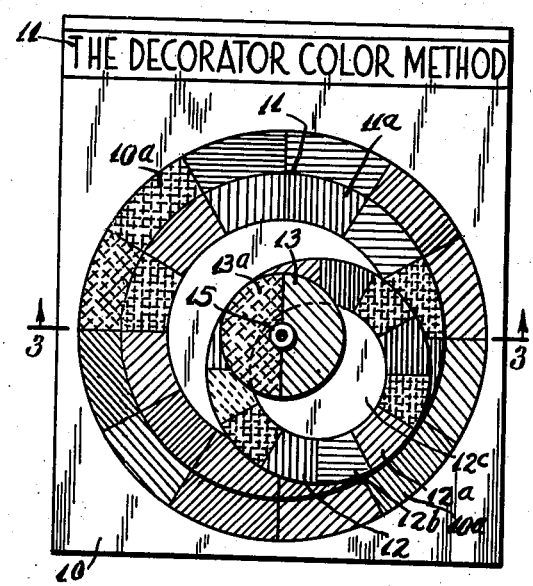
Fig. 2 is an elevational view similar to Fig. 1, but illustrating an adjusted position of the parts.
Figure 3:
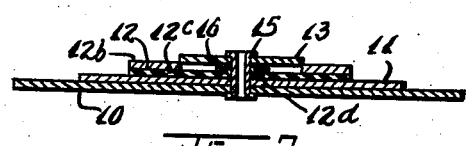
Fig. 3 is a sectional view taken on the line 3—3 of Fig. 2 but illustrated with all of the discs concentric.

The operation of this invention is as follows:

Normally, the rubber sheet 12ᶜ assumes a position in which the annular section 12ᵇ is concentric with the other sheets. The various discs may now be turned to place colors thereof adjacent each other. However, if it is desired to match a color on a section of the annular section 12ᵇ with a color on a section of the annular area 10ª it is possible to laterally force the disc 12 to place the sections to be matched adjacent each other. Fig. 2 shows the disc 12 shifted to one of these positions. However, it should be borne in mind that the disc 12 may be rotated relative to the other discs to any desirable location and may be shifted in any lateral direction.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. A color matching device, comprising a stiff base sheet, a plurality of superimposed concentric disc sheets axially rotatively mounted on said base sheet and of progressively smaller diameters from the bottom disc sheet to the top disc sheet, exposed adjacent concentric annular areas formed on said sheets and divided into sections of different colors to aid in matching colors, an intermediate disc of said disc sheets being formed with a central opening slightly less in diameter than the diameter of said top disc sheet, and a sheet of rubber material mounted on the bottom face of said intermediate disc sheet and across said opening, whereby the elasticity of said rubber sheet permits said intermediate disc sheet to be forced into any lateral position for matching the colors of said intermediate disc sheet with the colors of the annular area of said base sheet.

2. A color matching device, comprising a stiff base sheet, a plurality of superimposed concentric disc sheets axially rotatively mounted on said base sheet and of progressively smaller diameters from the bottom disc sheet to the top disc sheet, exposed adjacent concentric annular areas formed on said sheets and divided into sections of different colors to aid in maching colors, an intermediate disc of said disc sheets being formed with a central opening slightly less in diameter than the diameter of said top disc sheet, and a sheet of rubber material mounted on the bottom face of said intermediate disc sheet and across said opening, whereby the elasticity of said rubber sheet permits said intermediate disc sheet to be forced into any lateral position for matching the colors of said intermediate disc sheet with the colors of the annular area of said base sheet, means for preventing said top disc sheet from being depressed into the central opening of said intermediate disc sheet and so assuming a concaved shape.

3. A color matching device, comprising a stiff base sheet, a plurality of superimposed concentric disc sheets axially rotatively mounted on said base sheet and of progressively smaller diameters from the bottom disc sheet to the top disc sheet, exposed adjacent concentric annular areas formed on said sheets and divided into sections of different colors to aid in matching colors, an intermediate disc of said disc sheets being formed with a central opening slightly less in diameter than the diameter of said top disc sheet, and a sheet of rubber material mounted on the bottom face of said intermediate disc sheet and across said opening, whereby the elasticity of said rubber sheet permits said intermediate disc sheet to be forced into any lateral position for matching the colors of said intermediate disc sheet with the colors of the annular area of said base sheet, means for preventing said top disc sheet from being depressed into the central opening of said intermediate disc sheet and so assuming a concaved shape, comprising a concentric washer positioned between the top face of said sheet of rubber and the bottom face of said top disc sheet.

FRANK SCHEUER.